US012085245B2

(12) United States Patent
Wang

(10) Patent No.: US 12,085,245 B2
(45) Date of Patent: Sep. 10, 2024

(54) FLEXIBLE LED LIGHT-EMITTING LAMP STRIP

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 0 days.

(21) Appl. No.: 18/015,519

(22) PCT Filed: Jul. 6, 2021

(86) PCT No.: PCT/CN2021/104685
§ 371 (c)(1),
(2) Date: Jan. 10, 2023

(87) PCT Pub. No.: WO2022/012372
PCT Pub. Date: Jan. 20, 2022

(65) Prior Publication Data

US 2023/0258305 A1 Aug. 17, 2023

(30) Foreign Application Priority Data

Jul. 13, 2020 (CN) ........................ 202021359515.8

(51) Int. Cl.
*F21S 4/24* (2016.01)
*F21V 19/00* (2006.01)
(Continued)

(52) U.S. Cl.
CPC ............ *F21S 4/24* (2016.01); *F21V 19/0015* (2013.01); *F21V 23/06* (2013.01); *F21Y 2103/10* (2016.08); *F21Y 2115/10* (2016.08)

(58) Field of Classification Search
CPC .. F21Y 2115/10; F21Y 2103/10; F21V 23/06; F21V 19/0015; F21V 19/0025;
(Continued)

(56) References Cited

U.S. PATENT DOCUMENTS 10,378,747 B1 * 8/2019 Hanslip .................. H05B 45/20

FOREIGN PATENT DOCUMENTS

CN 201531847 U * 7/2010
CN 202691738 1/2013
(Continued)

OTHER PUBLICATIONS

Innovation Q + NPL Search (Year: 2023).*
International Search Report and Wirtten Opinion mailed in PCT/CN2021/04685 on Sep. 27, 2021 (13 pages).

*Primary Examiner* — Anabel Ton
(74) *Attorney, Agent, or Firm* — Wissing Miller LLP

(57) ABSTRACT

The present disclosure provides a flexible LED light-emitting lamp strip including a long strip-shaped flexible circuit substrate as well as a plurality of light-emitting units arranged in a length direction of the circuit substrate and welded to the circuit substrate. The plurality of light-emitting units are connected in parallel with one another, and each of the plurality of light-emitting units includes a front light-emitting LED lamp bead, a first side light-emitting LED lamp bead and a second side light-emitting LED lamp bead. A light-emitting direction of the front light-emitting LED lamp bead is perpendicular to the length direction of the circuit substrate, and a light-emitting direction of the first side light-emitting LED lamp bead and a light-emitting direction of the second side light-emitting LED lamp bead are parallel to a width direction of the circuit substrate and are opposite to each other, wherein the front light-emitting LED lamp bead, the first side light-emitting LED lamp bead and the second side light-emitting LED lamp bead are connected in series with one another.

9 Claims, 3 Drawing Sheets

(51) Int. Cl.

| | |
|---|---|
| ***F21V 23/06*** | (2006.01) |
| *F21Y 103/10* | (2016.01) |
| *F21Y 115/10* | (2016.01) |

(58) Field of Classification Search

CPC ........ F21V 19/003; F21S 4/24; H01L 27/153; H01L 27/156; F21K 9/272; F21K 9/278

See application file for complete search history.

(56) References Cited

FOREIGN PATENT DOCUMENTS

| | | | | |
|---|---|---|---|---|
| CN | 203489077 | | 3/2014 | |
| CN | 104832822 | | 8/2015 | |
| CN | 207049678 | | 2/2018 | |
| CN | 107781693 | | 3/2018 | |
| CN | 207621737 | | 7/2018 | |
| CN | 209762789 | | 12/2019 | |
| CN | 212644309 | | 3/2021 | |
| DE | 102008025398 | A1 * | 12/2009 | ................ F21S 4/24 |

* cited by examiner

A-A

FLEXIBLE LED LIGHT-EMITTING LAMP STRIP

CROSS-REFERENCE TO RELATED APPLICATIONS

This application claims a priority of Chinese utility model application No. 2020213595158 filed on Jul. 13, 2020, the entirety of which is incorporated herein by reference.

TECHNICAL FIELD

The present disclosure relates to a field of LED lighting fixtures, and specifically relate to a novel flexible LED light-emitting lamp strip.

BACKGROUND ART

LED light-emitting lamp strips have been widely applied to daily illumination. Current LED lamp strips available in the market are mainly divided into front light-emitting LED lamp strips and side light-emitting LED lamp strips. A front light-emitting LED lamp strip means that light is emitted from the front of a circuit substrate of the LED lamp strip, with a higher luminous brightness and generally focusing on the illumination effect; while a side light-emitting LED lamp strip means that light is emitted from a side of the circuit substrate of the LED lamp strip, typically with a lower luminous brightness and softer light, mainly used for decoration. However, the existing products have a single function, either illumination or decoration, and can not emit light from both the front and the sides, or can not select to emit light from a certain side.

SUMMARY

In order to overcome the defects in the prior art, the present disclosure provides a novel flexible LED light-emitting lamp strip adopting the following technical solutions:

A flexible LED light-emitting lamp strip comprises a long strip-shaped flexible circuit substrate as well as a plurality of light-emitting units arranged in a length direction of the circuit substrate and welded to the circuit substrate; wherein the plurality of light-emitting units are connected in parallel with one another, and each of the plurality of light-emitting units includes a front light-emitting LED lamp bead, a first side light-emitting LED lamp bead, and a second side light-emitting LED lamp bead, wherein a light-emitting direction of the front light-emitting LED lamp bead is perpendicular to the length direction of the circuit substrate, and a light-emitting direction of the first side light-emitting LED lamp bead and a light-emitting direction of the second side light-emitting LED lamp bead are parallel to a width direction of the circuit substrate and are opposite to each other, wherein the front light-emitting LED lamp bead, the first side light-emitting LED lamp bead, and the second side light-emitting LED lamp bead are connected in series with one another.

In the flexible LED light-emitting lamp strip, the front light-emitting LED lamp bead is a full color RGB lamp bead.

In the flexible LED light-emitting lamp strip, each of the plurality of light-emitting units further includes a resistance element that performs voltage reduction and current limitation for the front light-emitting LED lamp bead, the first side light-emitting LED lamp bead, and the second side light-emitting LED lamp bead.

In the flexible LED light-emitting lamp strip, the flexible LED light-emitting lamp strip further includes a transparent packaging tape that extends along the length direction of the circuit substrate and covers the circuit substrate as well as the front light-emitting LED lamp bead, the first side light-emitting LED lamp bead and the second side light-emitting LED lamp bead of each of the plurality of light-emitting units welded on the circuit substrate.

In the flexible LED light-emitting lamp strip, the flexible LED light-emitting lamp strip further includes a cutoff indicator mark disposed on the circuit substrate at a location between adjacent light-emitting units.

In the flexible LED light-emitting lamp strip, the flexible LED light-emitting lamp strip further includes an external controller for powering, and controlling a light-emitting mode of, the flexible LED light-emitting lamp strip.

In the flexible LED light-emitting lamp strip, a control module for controlling a light-emitting mode of the flexible LED light-emitting lamp strip is further provided at one end of the circuit substrate of the flexible LED light-emitting lamp strip.

In the flexible LED light-emitting lamp strip, a double-sided adhesive film is further provided on a non-light emitting side of the flexible LED light-emitting lamp strip.

In the flexible LED light-emitting lamp strip, a power input port and a power output port are further provided on both ends of the flexible LED light-emitting lamp strip, respectively.

In the flexible LED light-emitting lamp strip, the power input port is provided with 6 electrical connection plugs, and the power output port is provided with 6 electrical connection sockets.

In the flexible LED light-emitting lamp strip, power input ports and power output ports of a plurality of flexible LED light-emitting lamp strips are connectable to each other end-to-end.

Compared with the prior art, the present disclosure can achieve the following advantageous effects: the flexible LED light-emitting lamp strip of the present disclosure can both emit light from the front to implement an illumination effect and emit light from one or two sides simultaneously to implement a decoration effect; and also can emit light from the front and two sides simultaneously to implement both an illumination effect and a decoration effect.

REFERENCE NUMERALS ARE LISTED BELOW

1. flexible LED light-emitting lamp strip;
2. flexible circuit substrate;

3. light-emitting units;
31. front light-emitting LED lamp bead;
32. first side light-emitting LED lamp bead;
33. second side light-emitting LED lamp bead;
4. transparent packaging tape;
5. resistance element;
6. cutoff indicator mark;
71. power input port;
72. power output port;
8. control module; and
9. control button.

DETAILED DESCRIPTION OF THE EMBODIMENTS

Specific implementations of a flexible LED light-emitting lamp strip according to the present disclosure are described below with reference to the accompanying drawings.

Figure 1:
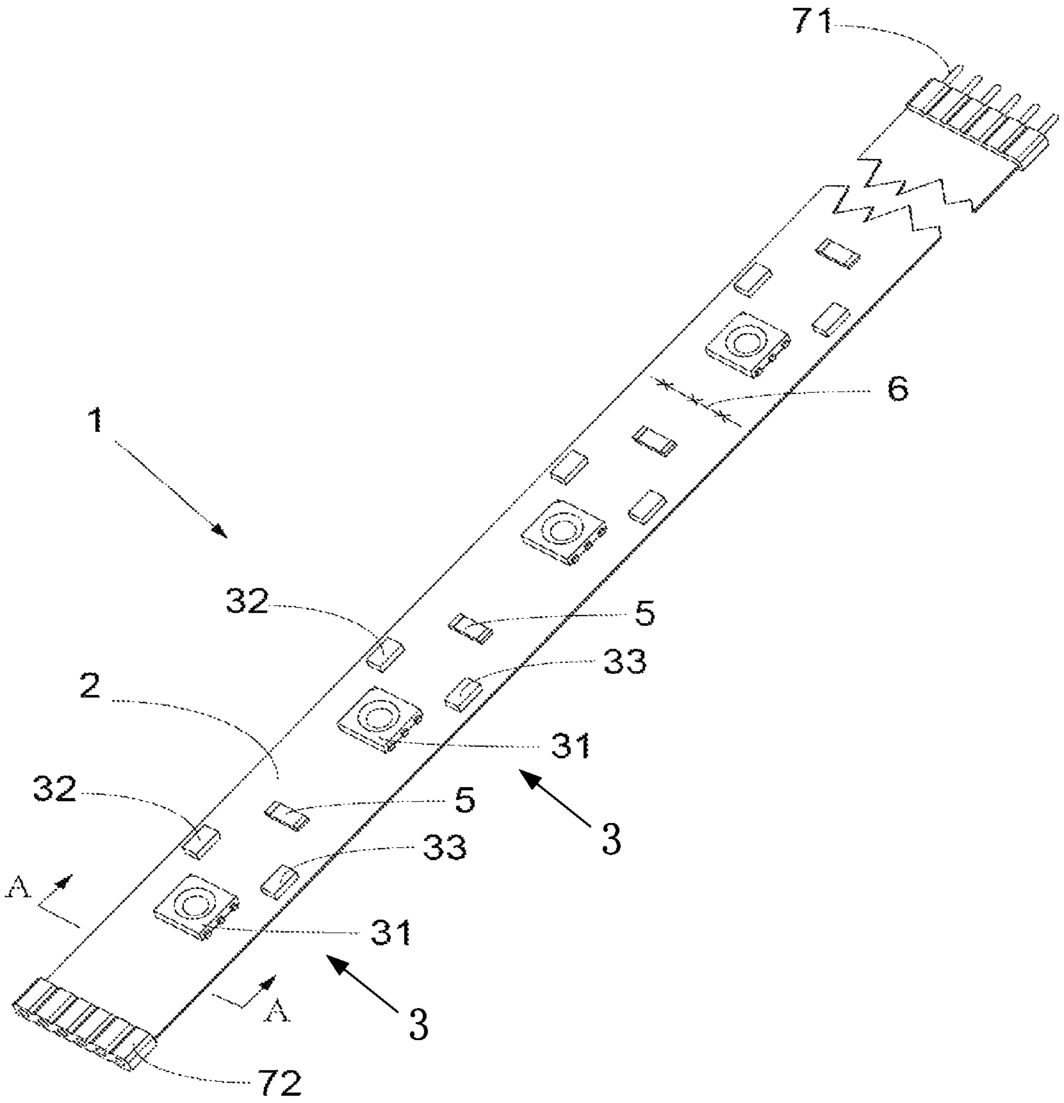
FIG. 1 is a schematic perspective view of a flexible LED light-emitting lamp strip according to the present disclosure.
Figure 2:
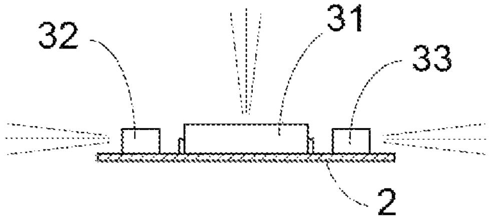
FIG. 2 is a cross-sectional view taken along a direction A-A in FIG. 1 of the flexible LED light-emitting lamp strip according to the present disclosure.

As shown in FIGS. 1 and 2, a reference numeral 1 denotes a flexible LED light-emitting lamp strip of the present disclosure, which includes a long strip-shaped flexible circuit substrate 2 as well as a plurality of light-emitting units 3 arranged in a length direction of the circuit substrate 2 and welded on a front surface (a light-emitting surface, or a mounting surface of a LED lamp bead) of the circuit substrate 2. The plurality of light-emitting units 3 are connected in parallel with one another, and each of the plurality of light-emitting units 3 includes a front light-emitting LED lamp bead 31, a first side light-emitting LED lamp bead 32 and a second side light-emitting LED lamp bead 33. A light-emitting direction of the front light-emitting LED lamp bead 31 is perpendicular to the length direction of the circuit substrate 2, and a light-emitting direction of the first side light-emitting LED lamp bead 32 and a light-emitting direction of the second side light-emitting LED lamp bead 33 are parallel to a width direction of the circuit substrate 2 and are opposite to each other. In the light-emitting lamp strip 1, the front light-emitting LED lamp bead 31, the first side light-emitting LED lamp bead 32 and the second side light-emitting LED lamp bead 33 are connected in series with one another.

When used for illumination, a monochromatic white light or warm white light lamp bead is used as the front light-emitting LED lamp bead 31, and when used for decoration, the front light-emitting LED lamp bead 31 is a full color RGB lamp bead.

A typical operating voltage of the LED lamp beads is about 3V. Therefore, when the flexible LED light-emitting lamp strip 1 is produced for use under different voltages, different series-parallel connection modes of the lamp beads may be adopted. For example, under a voltage of 12V, 3 LED lamp beads are desired to be connected in series, and is then further connected in series with a voltage divider resistance element 5 to restrict a magnitude of current, so that the LED lamp beads can work safely. 3 LED lamp beads and one resistance element 5 are connected in series to constitute one light-emitting unit 3, and then a plurality of light-emitting units 3 are connected in parallel with one another. In actual use, the light-emitting lamp strip 1 is often cut into a proper length as desired. However, if the light-emitting lamp strip 1 is cut at a certain position within a light-emitting unit, the 3 LED lamp beads in the light-emitting unit will not emit light any more. Therefore, a cutoff indicator mark 6 is further provided between adjacent light-emitting units 3 in the light-emitting lamp strip 1, and the function of the light-emitting lamp strip will not be affected if the light-emitting lamp strip 1 is cut or broken at the cutoff indicator mark 6.

A power input port 71 and a power output port 72 are further provided on both ends of the light-emitting lamp strip 1, respectively. When the front light-emitting LED lamp bead 31 is a monochromatic white light lamp bead, 4 electrical connection plugs are provided in the power input port 71, wherein one of the electrical connection plugs is a common port, and the other three of the electrical connection plugs supply power for the front light-emitting LED lamp bead 31, the first side light-emitting LED lamp bead 32 and the second side light-emitting LED lamp bead 33, respectively. By controlling on/off and intensity (strength/weakness) of the current in the electrical connection plugs, the light-emitting lamp strip 1 can be controlled to a certain light-emitting mode, such as emitting light merely from the front, merely from one side, or from both sides, or the like. At this time, the power output port 72 is correspondingly provided with 4 electrical connection sockets. The power output port 72 of one light-emitting lamp strip 1 on the upstream may be connected to the power input port 71 of another light-emitting lamp strip 1 on the downstream.

When the front light-emitting LED lamp bead 31 is a full color RGB lamp bead, since three LED chips, i.e., one red LED chip, one green LED chip and one blue LED chip, are actually contained in one full color RGB lamp bead, the three LED chips can emit and mix various different colors of light when charged by currents with different intensities, respectively. At this time, the power input port 71 is provided with 6 electrical connection plugs, wherein one of the electrical connection plugs is a common port, and the other five of the electrical connection plugs supply power for the first side light-emitting LED lamp bead 32, the second side light-emitting LED lamp bead 33, the red LED chip, the green LED chip and the blue LED chip, respectively. In this case, the power output port 72 is correspondingly provided with 6 electrical connection sockets. Likewise, the power output port 72 of one light-emitting lamp strip 1 on the upstream may be connected to the power input port 71 of another light-emitting lamp strip 1 on the downstream.

As an embodiment, when a length desired by a user of a light-emitting lamp strip is greater than the length of a single flexible LED light-emitting lamp strip 1, power input ports 71 and power output ports 72 of a plurality of flexible LED light-emitting lamp strips 1 may be connected to each other end-to-end to form a long string.

Figure 3:
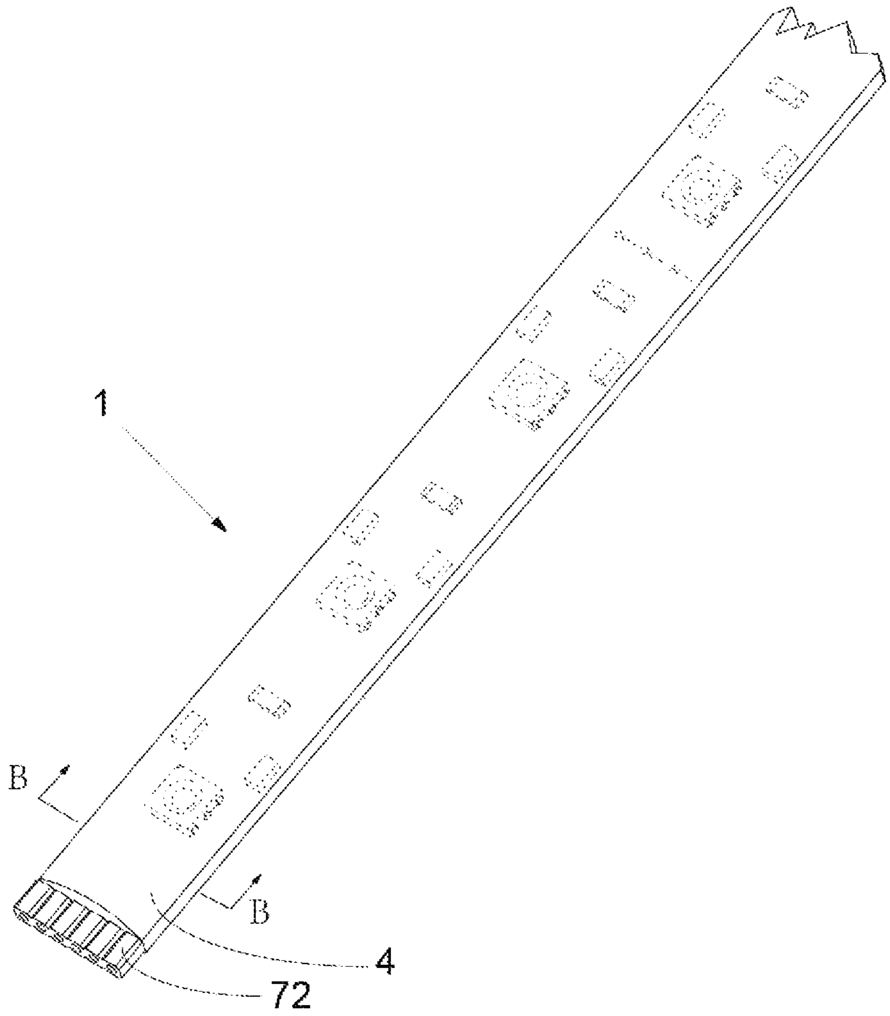
FIG. 3 is a schematic perspective view of the flexible LED light-emitting lamp strip according to the present disclosure in which a transparent packaging tape is provided.
Figure 4:
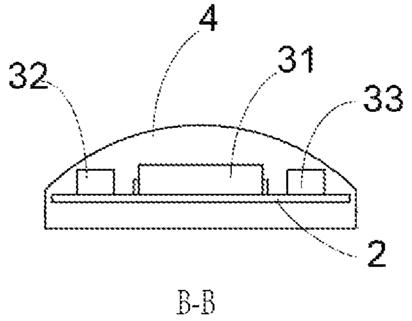
FIG. 4 is a cross-sectional view taken along a direction B-B in FIG. 3 of the flexible LED light-emitting lamp strip according to the present disclosure.

In an embodiment, as shown in FIGS. 3 and 4, the light-emitting lamp strip 1 further includes a transparent packaging tape 4 that extends along the length direction of the circuit substrate 2 and is configured to wrap or cover the circuit substrate 2 as well as the front light-emitting LED lamp bead 31, the first side light-emitting LED lamp bead 32 and the second side light-emitting LED lamp bead 33 of each of the plurality of light-emitting units 3 welded on the circuit substrate 2. The transparent packaging tape 4 plays a role of preventing water and dust for the light-emitting lamp strip 1 and preventing electric shock for a user.

In an embodiment, the LED light-emitting lamp strip 1 further includes an external controller (not shown) for powering, and controlling a light-emitting mode of, the flexible LED light-emitting lamp strip 1. An output end of the external controller is connected to the power input port 71 of the LED light-emitting lamp strip, and a user may control the light-emitting mode of the LED light-emitting lamp strip 1 via the external controller.

Figure 5:
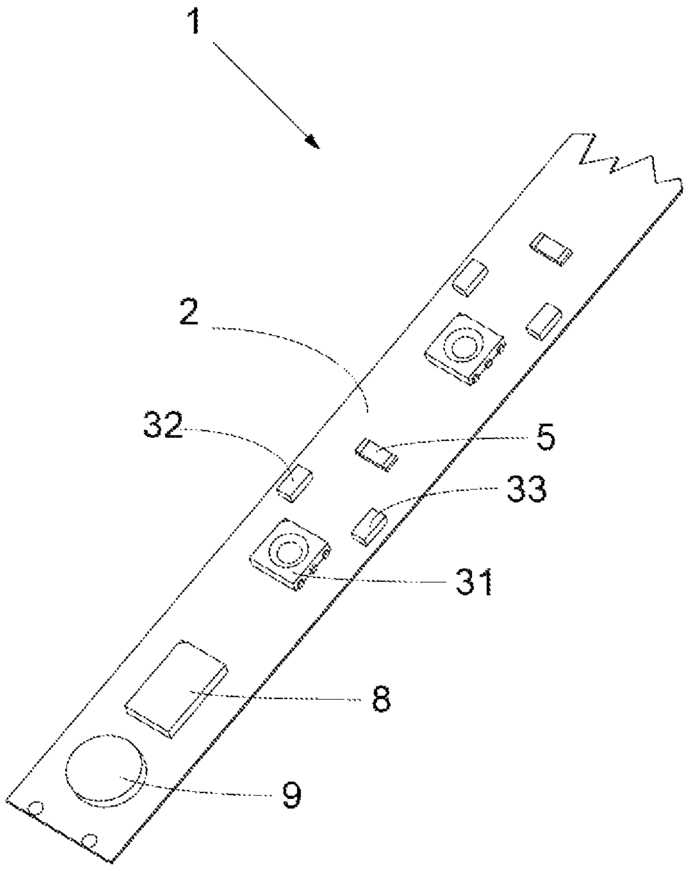
FIG. 5 is a schematic diagram of a control module in the flexible LED light-emitting lamp strip according to the present disclosure.

In an embodiment, as shown in FIG. 5, without the external controller, a control module 8 and a control button 9 for controlling the light-emitting mode of the LED light-emitting lamp strip 1 are further provided on one end of the circuit substrate 2 of the LED light-emitting lamp strip 1. The light-emitting mode of the LED light-emitting lamp strip 1 can be changed via the control button 9, so that no external controller is required, and the lamp strip is more convenient and lighter to use.

In an embodiment, a double-sided adhesive film is further provided on a non-light emitting side (e.g., a back side of the circuit substrate 2) of the LED light-emitting lamp strip 1, so as to facilitate quick installation at a desired position.

The main features, technical principles and advantages of the present disclosure have been described above in combination with embodiments. However, the above embodiments are not intended to limit the present disclosure. Any modifications, equivalent substitutions or improvements of the present disclosure without departing from the spirit or essence of the present disclosure shall fall within the protection scope of the present disclosure.

What is claimed is:

1. A flexible LED light-emitting lamp strip, comprising:

a long strip-shaped flexible circuit substrate having a plurality of light-emitting units arranged in a length direction of the circuit substrate and welded to the circuit substrate;

a power input port provided at a first end of the circuit substrate; and a power output port provided at a second end of the circuit substrate;

wherein the plurality of light-emitting units are connected in parallel with one another, and each of the plurality of light-emitting units includes a front light-emitting LED lamp bead, a first side light-emitting LED lamp bead and a second side light-emitting LED lamp bead;

wherein a light-emitting direction of the front light-emitting LED lamp bead is perpendicular to the length direction of the circuit substrate, and a light-emitting direction of the first side light-emitting LED lamp bead and a light-emitting direction of the second side light-emitting LED lamp bead are parallel to a width direction of the circuit substrate and are opposite to each other;

wherein the front light-emitting LED lamp bead, the first side light-emitting LED lamp bead and the second side light-emitting LED lamp bead are connected in series with one another; and wherein the power input port and the power output port differ in structure and are configured to mate with each other, such that the power output port of one flexible LED light-emitting lamp strip can be directly connected to the power input port of another flexible LED light-emitting lamp strip.

2. The flexible LED light-emitting lamp strip according to claim 1, wherein the front light-emitting LED lamp bead is a full color RGB lamp bead.

3. The flexible LED light-emitting lamp strip according to claim 1, wherein each of the plurality of light-emitting units further comprises a resistance element that performs voltage reduction and current limitation for the front light-emitting LED lamp bead, the first side light-emitting LED lamp bead and the second side light-emitting LED lamp bead.

4. The flexible LED light-emitting lamp strip according to claim 1, wherein the flexible LED light-emitting lamp strip further comprises a transparent packaging tape that extends along the length direction of the circuit substrate and covers the circuit substrate as well as the front light-emitting LED lamp bead, the first side light-emitting LED lamp bead and the second side light-emitting LED lamp bead of each of the plurality of light-emitting units welded on the circuit substrate.

5. The flexible LED light-emitting lamp strip according to claim 1, wherein the flexible LED light-emitting lamp strip further comprises a cutoff indicator mark disposed on the circuit substrate at a location between adjacent light-emitting units.

6. The flexible LED light-emitting lamp strip according to claim 1, wherein the flexible LED light-emitting lamp strip further comprises an external controller for powering, and controlling a light-emitting mode of, the flexible LED light-emitting lamp strip.

7. The flexible LED light-emitting lamp strip according to claim 1, wherein a control module for controlling a light-emitting mode of the flexible LED light-emitting lamp strip is further provided on one end of the circuit substrate of the flexible LED light-emitting lamp strip.

8. The flexible LED light-emitting lamp strip according to claim 1, wherein a double-sided adhesive film is further provided on a non-light emitting side of the flexible LED light-emitting lamp strip.

9. The flexible LED light-emitting lamp strip according to claim 1, wherein the power input port is provided with 6 electrical connection plugs, and the power output port is provided with 6 electrical connection sockets.

* * * * *